United States Patent [19]

Redman

[11] 3,745,845
[45] July 17, 1973

[54] SPEED CHANGER
[76] Inventor: George L. Redman, 335 Church St., East Alton, Ill. 62024
[22] Filed: Nov. 17, 1971
[21] Appl. No.: 199,617

[52] U.S. Cl. .................... 74/217 S, 74/242.15 R
[51] Int. Cl. ..................... F16h 9/06, F16h 7/10
[58] Field of Search .............. 74/242.3, 242.15 R, 74/217 R, 217 S, 242.1

[56] References Cited
UNITED STATES PATENTS
2,664,756   1/1954   Fismer .......................... 74/217 S Primary Examiner—Manuel A. Antonakas
Assistant Examiner—Thomas C. Perry
Attorney—Ralph W. Kalish

[57] ABSTRACT

For use with machine tools having a prime mover with a drive shaft and a drive pulley mounted thereon and a driven shaft mounting a tool and having a driven pulley thereon, a speed changer comprising an intermediate shaft disposed between the said drive shaft and driven shaft and being adapted for rockable movement with respect thereto but within the same plane; pulleys carried on each end of said shaft with means respectively engaging same to said drive pulley and said driven pulley.

5 Claims, 6 Drawing Figures

INVENTOR
GEORGE L. REDMAN
BY *Ralph W. Kalish*
ATTORNEY

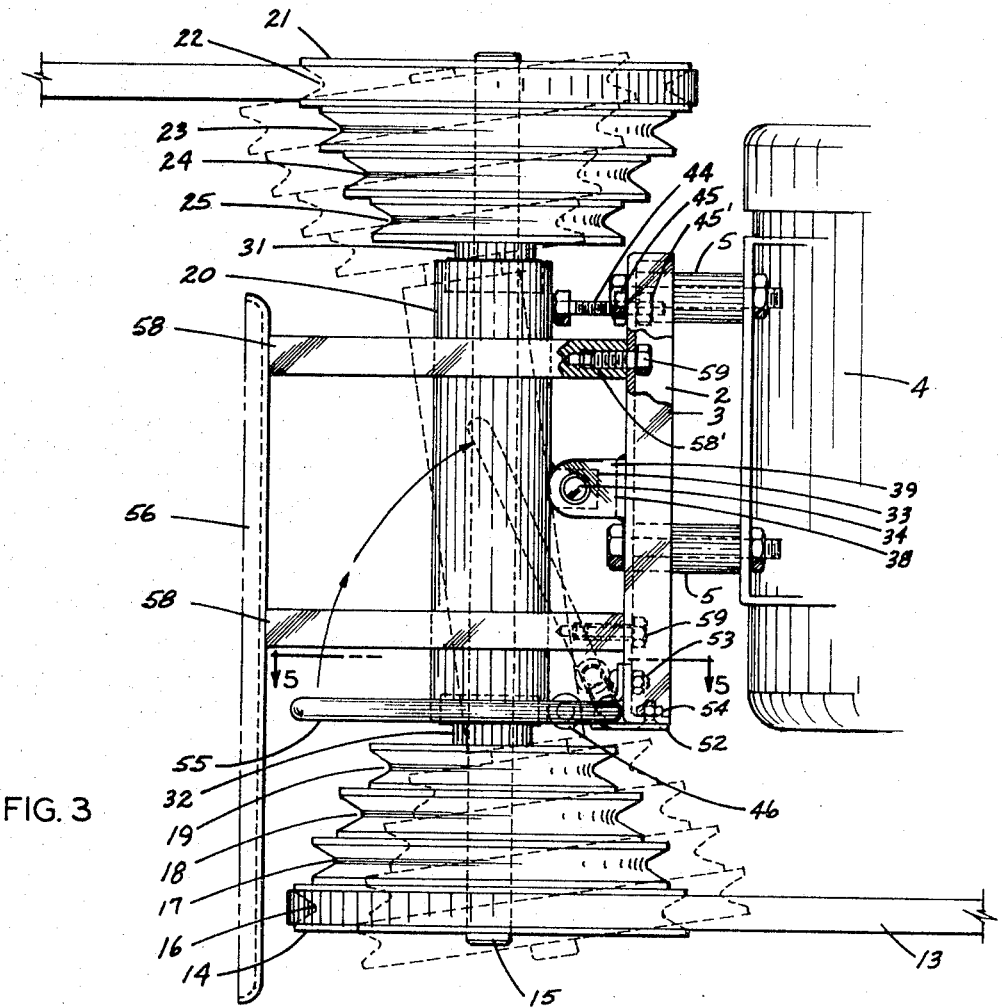
FIG. 3
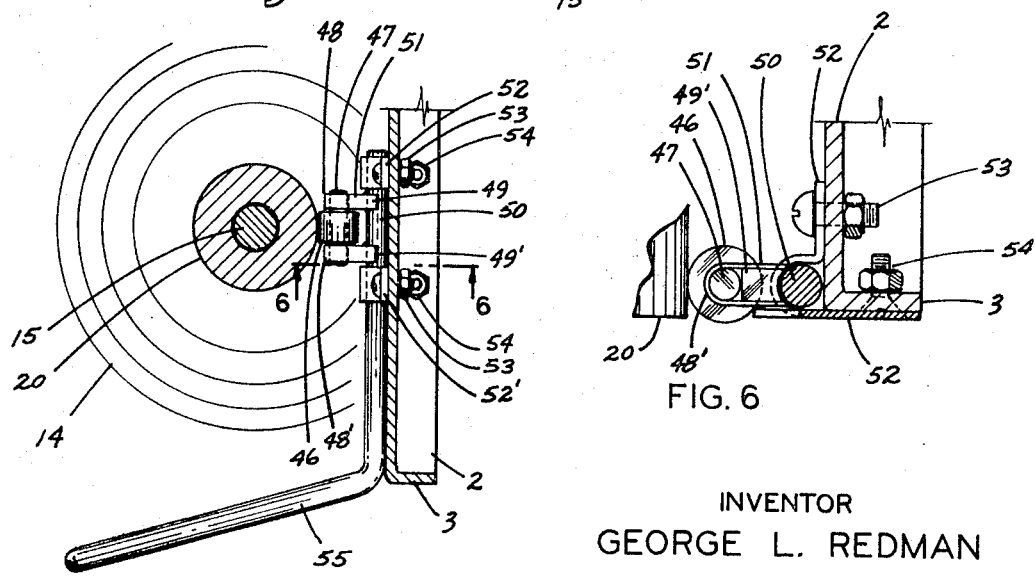
FIG. 5
FIG. 6
INVENTOR
GEORGE L. REDMAN
BY Ralph W. Kalish
ATTORNEY 3,745,845

SPEED CHANGER

BACKGROUND AND SUMMARY OF THE INVENTION

This invention relates in general to machine or power driven tools and, more particularly, to a speed change device for use therewith.

Heretofore, various efforts have been made for developing gearless speed changers, including belt shifting apparatuses for use with machine tools incorporating stepped cone pulleys. Invariably the associated mechanisms have been relatively complex in structure, as well as costly in production since the same have been designed to alter the relationship between a single set of stepped pulleys, one being on the motor drive shaft and the other being carried upon the driven, tool-carrying shaft of the related mechanism.

Therefore, it is an object of the present invention to provide a speed changer for use with machine tools wherein the pulley on the motor drive shaft is not connected directly to the driven shaft of the associated tool so that the same at all times remain in fixed relationship, obviating the possibility of damage or misalignment.

It is another object of the present invention to provide a speed changer of the type stated which incorporates means for disposition between the motor drive shaft and the main driven shaft which is mounted for ready and easy manipulation to effect a desired change of speed.

It is a further object of the present invention to provide a speed changer of the type stated, the use of which will substantially quadruple the number of operating speeds to be accorded the related tool.

It is a still further object of the present invention to provide a speed changer which may be readily utilized with existing machine tools and which use does not necessitate costly or time-consuming modification of the particular tool.

It is another object of the present invention to provide a speed changer of the type stated which is easily and quickly manipulated to permit of a change in the belt disposition for bringing about the intended speed change so that minimal time is lost from machine operation.

It is a further object of the present invention to provide a speed changer of the type stated which may be most economically produced; which is reliable and durable in operation; which has a marked simplicity of parts so as to be resistant to breakdown; and which is operated with facility in the average home work shop.

BRIEF DESCRIPTION OF THE DRAWINGS

FIG. 3 is an enlarged fragmentary side elevational view.

FIG. 4 is a horizontal transverse sectional view taken on the line 4—4 of FIG. 2.

FIG. 5 is a horizontal transverse sectional view taken on the line 5—5 of FIG. 3.

FIG. 6 is a vertical transverse sectional view taken on the line 6—6 of FIG. 5.

DESCRIPTION OF THE PREFERRED EMBODIMENT

Figure 1:
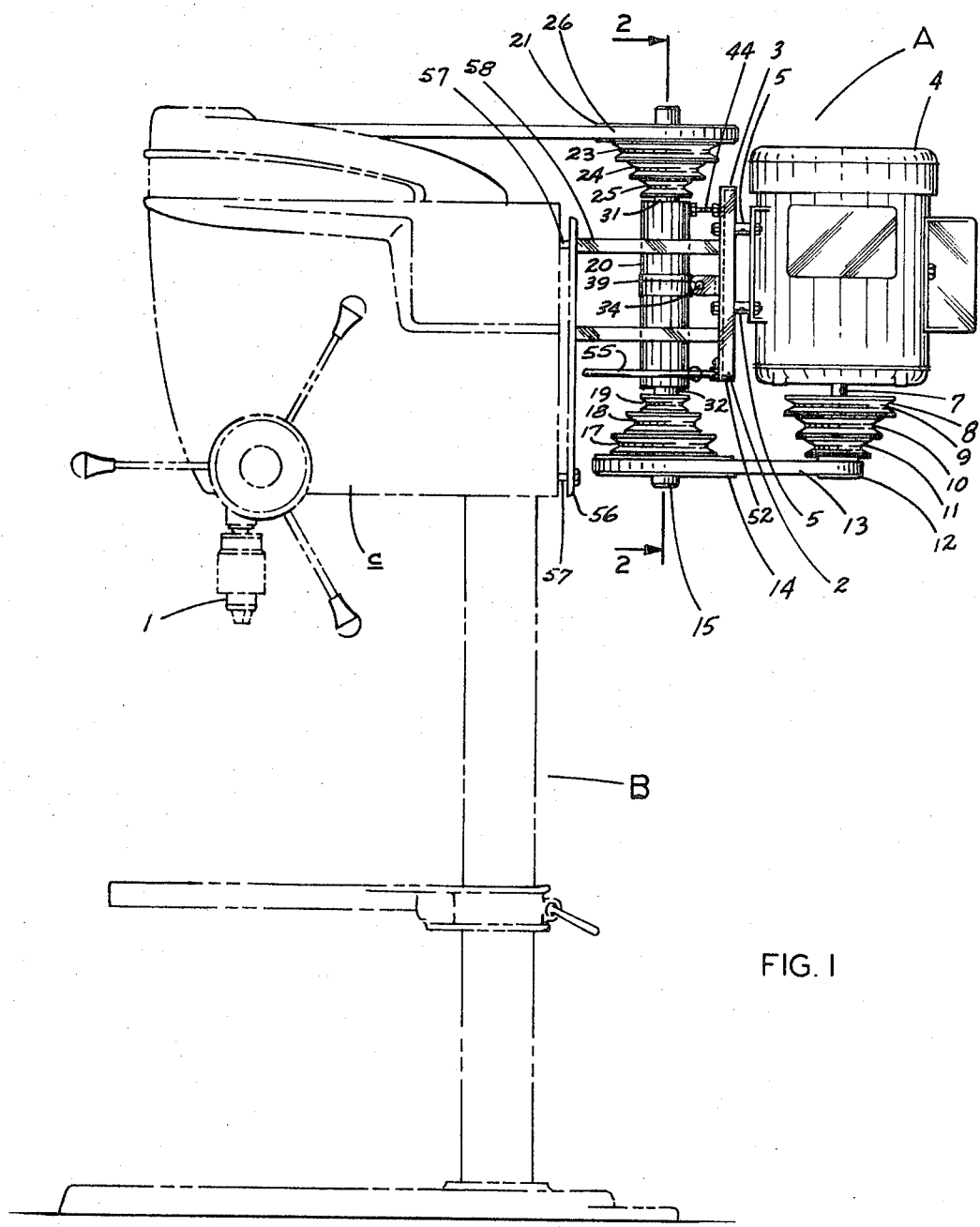
FIG. 1 is a side elevational view of a speed changer constructed in accordance with and embodying the present invention, illustrating same in operative disposition upon a machine tool.
Figure 2:
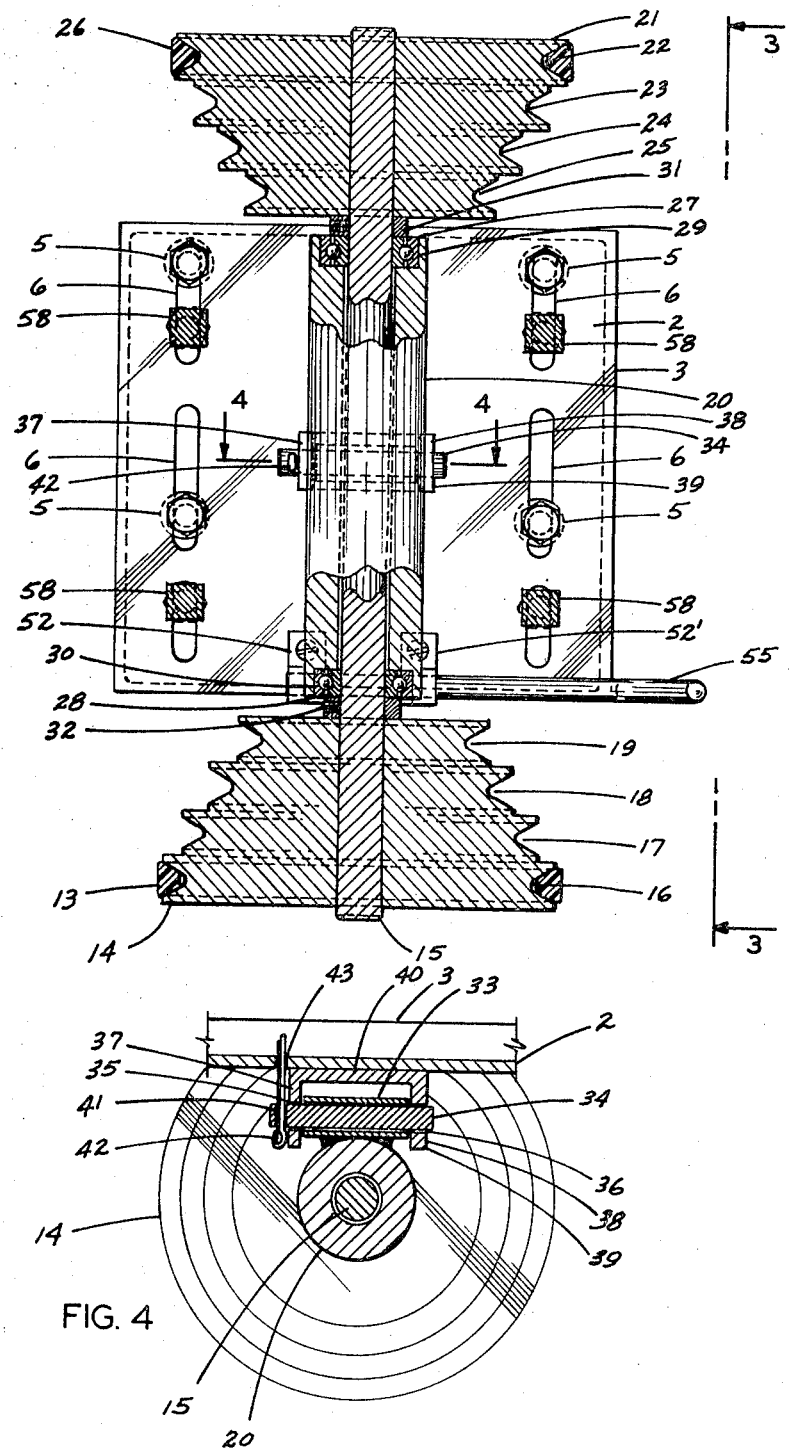
FIG. 2 is a vertical transverse sectional view taken on the line 2—2 of FIG. 1.

Referring now by reference characters to the drawings which illustrate the preferred embodiment of the present invention, A generally designates a speed changer of the gearless type as adapted primarily for use with machine tools. For purposes of illustration, speed changer A is illustrated in FIG. 1 as being integrated with a drill press shown substantially in phantom lines and designated B; which latter does not form a part of the present invention, and incorporates the customary driven shaft (not shown) for engagement to the usual drill chuck 1 for connection to a drill or other tool (not shown).

Speed changer A incorporates a support plate 2, as of quadrilateral contour, in planar parallel, confronting relationship to the rear face of the housing c of drill press B; said plate 2 having a continuous marginal reinforcing flange 3 directed rearwardly, or away from, said drill press B. Rearwardly of said plate 2 is a prime mover or motor 4 being suitably mounted upon said plate, as by spaced bolts 5, each of which, at their forward ends, project through an elongated opening 6 permitting of desired vertical adjustment of prime mover 4 with respect to said plate 2.

Prime mover 4 incorporates a drive shaft 7 extending downwardly thereof, projecting beyond the lower edge of plate 2 and mounting upon its extended end a driving, stepped cone pulley 8, the latter being secured upon said shaft 7 by conventional means. Pulley 8 is illustrated as incorporating four separate steps, or annular grooves, of decreasing diameter downwardly and being respectively designated 9, 10, 11 and 12. Provided for training about a selected step of drive pulley 8 is the rearward portion of an endless transmission belt 13 which may be either of the flat or V-type (depending upon the contour of the steps) and which, at its forward portion, extends about an aligned step of an intermediate driven stepped cone pulley 14 carried upon the lower end of an intermediate shaft 15 presented forwardly of support plate 2 on the opposite side thereof from said prime mover 4. Pulley 14 is shown as comprising four separate steps of gradually decreasing diameter upwardly and designated 16, 17, 18 and 19, respectively, so that pulleys 8 and 14 are presented with respect to each other whereby their steps are aligned in inverse relationship to the diameters thereof.

Intermediate shaft 15 extends through a cylindrical housing 20 approximately coextensive with the height of plate 2 and projects in its upper portion beyond the upper end of housing 20 and plate 2 for mounting thereon, by any suitable means, a driven stepped cone pulley 21 which is structurally similar to pulleys 8 and 14 above described, but being presented so that its steps, as indicated at 22, 23, 24 and 25, are respectively of decreasing diameter downwardly. An endless drive belt 26 operatively connects driven pulley 21 with the driven shaft (not shown) of drill press B; it being understood that such driven shaft may carry a stepped cone pulley (not shown) in appropriate inverse relationship to driven pulley 21.

At each of its upper and lower ends housing 20 is counterbored, as at 27, 28, respectively, to receive a frictionless bearing of the ball bearing type 29, 30, respectively, with the inner race thereof disposed upon intermediate shaft 15. Outwardly of each bearing 29,30, a collar 31,32, respectively, is disposed about shaft 15 and being secured thereon as by a set screw. Thus, shaft 15 is suitably journalled within bearings 29,30; the bore of housing 20 being slightly greater than the diameter of shaft 15 so as to prevent any undesired rotation-inhibiting contact therewith. Housing 20 substantially intermediate its length is fixed on its rearward face, as by welding, to a sleeve or bushing 33 which is preferably of square cross section and in axially normal relationship to the said housing 20. Extending freely through sleeve 33 is a short shaft 34 which, at its opposite ends, extends through bearings 35,36 provided in the opposed arms 37,38 of a U-shaped bracket 39 having its web 40 rigid, as by welding, upon the forward face of plate 2. At its end outwardly of arm 37, shaft 34 is provided with a transverse opening 41 for extension therethrough of a cotter pin 42, the rearward end of which projects through an aperture 43 formed in plate 2. Thus, by reason of the engagement of cotter pin 42, shaft 34 is fixed whereby housing 20 may be swung with relationship thereto through relative movement of sleeve 33 about shaft 34. By the aforesaid mounting of housing 20, it will be seen that shaft 15, for purposes to be described hereinbelow, is thus rockable with respect to the plane of plate 2, as indicated in phantom lines in FIG. 3.

Presented for abutment against housing 20 in its upper rearward portion is an adjustable stop 44 constituted of a bolt extending through plate 2 and maintainable in selected threaded disposition by retainer nuts 45, 45'. The lower rearward end of housing 20 normally abuts against a roller 46 fixed upon a short stub shaft 47 journalled at its ends in bearings 48, 48' developed by the end surfaces of short arms 49, 49', respectively, which at their rearward ends are welded or otherwise fixed upon a rock shaft 50 and a generally U-shaped strap-like member 51 having its bight extending about shaft 47 and its legs rigid with the upper and lower surfaces of the related arm 49,49' (see FIG. 6). Said rock arm 50 is presented immediately forwardly of the lower portion of plate 2 and is supported for rotation within bearings 52,52' formed from flat strip stock and being secured to plate 2 and to the bottom portion of flange 3 thereof as by bolts at 53,54, respectively. Rock arm 50 progresses to a point substantially aligned with one lateral edge of plate 2 and thereat is continuous with a forwardly and slightly laterally extending lever arm 55 by manipulation of which rock arm 50 may be rotated within its bearings 52 for causing upward and rearward swinging of roller 46 toward plate 2 and from engagement with housing 20 so that the latter, together with shaft 15 may be tilted or rocked with respect to the vertical about the pivot axis developed by shaft 34 to cause intermediate pulley 14 to be swung slightly upwardly and rearwardly toward drive pulley 8 and with commensurate forward swinging of driven pulley 21.

Speed changer A may be mounted upon the associated machine or power driven tool in any convenient manner, such as by a mounting plate 56 secured to drill press housing c by bolts 57; there being a plurality of suitably spaced rods 58 extending between mounting plate 56 and plate 2 and having their ends drilled and tapped, as at 58', for receiving bolts 59 progressing through openings within said mounting plate 56 and support plate 2; said rods 58 thus firmly maintaining speed changer A in appropriate disposition. It will, of course, be seen that rods 58 are of suitable length so as not to interfere with any tilting movement of housing 20 and the structure associated therewith.

In view of the foregoing, the operation and marked attributes of speed changer A should be apparent. With housing 20 abutting against stop 44 and roller 46, the same will be in vertical operative disposition with the associated intermediate shaft 15 axially parallel to drive shaft 7 whereby belts 13 and 26 are in motion transmitting condition, being requisitely taut. When it is desired to shift either belt 13 or 26, or both, so as to bring about an alteration in the angular velocity ratio between the associated pulleys, the operator need merely grasp lever 55 and lift upwardly thereon to remove roller 46 from engagement with housing 20 (as into the position shown in phantom lines in FIG. 3) thereby freeing housing 20 together with its associated shaft and pulleys for tilting or, as it were, into movement out of parallelism with drive shaft 7 for lessening the effective distance between pulleys 8 and 14, as well as pulley 21 and the companion pulley (not shown) on the machine tool B whereby a slackening of the associated belts is produced to permit the operator to readily shift same for interconnecting a different set of steps on the co-ordinating pulleys. By means of the novel interposition of intermediate shaft between the drive shaft 7 of speed changer A and the driven shaft of the machine tool, an unusual facility for effecting a change of speeds is accorded the operator. The structure producing the requisite swingability of housing 20 together with shaft 15 is quite simple as compared to prior art structures involving complex means for altering the relationship directly between the drive shaft and the driven shaft for speed changing purposes. Furthermore, by the present construction the various pulleys are exposed for ease of access so that the speed changing procedure may be effected quickly and with minimum effort.

Another attribute of the present invention is the provision of structure providing for a potential of a greater range of speeds than heretofore obtainable by current devices. To the present time by the conventional utilization of a driving pulley and a driven pulley, the number of speeds possible would correspond directly to the number of steps on the associated stepped pulleys which would normally be four. With the construction of the present invention wherein there are effectively two sets of paired pulleys, there would be four times as many different speeds of operation possible as with but a single pair of pulleys. Accordingly, by the insertion of pulleys 14 and 21 between drive pulley 8 and the driven pulley of the associated machine tool, the number of different speeds is quadrupled over that of speed change devices heretofore known.

Accordingly, the use of speed changer A brings about features of substantial appeal to the average machine tool operator and which particularly render home power tools of marked versatility.

Having thus described my invention, what I claim and desire to obtain by Letters Patent is -

1. A transmission system for power tools comprising a prime mover, a drive shaft engaged to said prime mover, a driven shaft, means operatively engaging a tool to said driven shaft, means fixing said drive shaft and said driven shaft in axially parallel relationship, an intermediate shaft disposed between said drive shaft and said driven shaft, first means connecting said intermediate shaft to said drive shaft, second means connecting said intermediate shaft to said driven shaft, means defining a housing receiving said intermediate shaft, means pivotally mounting said housing for swingable movement about a horizontal axis whereby said intermediate shaft is rendered rockable between operative position wherein the same is axially parallel to said drive shaft and said driven shaft, and inoperative position wherein the same is out of axial parallelism with said drive shaft and said driven shaft, adjustable means for limiting the disposition of one end portion of said housing with respect to said prime mover, and roller means engageable with the other end portion of said housing and being adapted for swingable movement about a horizontal axis for movement toward and away from said prime mover.

2. A transmission system for power tools as defined in claim 1 and further characterized by a plate mounted on said prime mover in confronting relationship to said intermediate shaft housing, said pivotal mounting means for said housing comprising a bracket mounting on said plate and having spaced apart bearings, a shaft carried in said bearings, and means defining a sleeve fixed on said housing and receiving said shaft.

3. A transmission system for power tools as defined in claim 1 and further characterized by a plate mounted on said prime mover in confronting relationship to said intermediate shaft housing, said roller means comprising bearings provided on said plate and spaced apart transversely thereof, a rock arm journalled in said bearings, spaced bearing members fixed on said rock arm between said bearings, a shaft journalled in said bearing members in axial parallel relationship to said rock arm, a roller fixed on said shaft and engageable upon its periphery with said housing, and means for swinging said rock arm for removing said roller from engagement with said housing to free the latter for swinging about said pivotal horizontal axis.

4. A transmission system for power tools as defined in claim 3 and further characterized by said means for swinging said rock arm comprising a lever arm integral with said rock arm at one end thereof, said lever arm extending laterally outwardly of the adjacent portion of said plate.

5. A transmission system for power tools as defined in claim 1 and further characterized by a plate mounted on said prime mover in confronting relationship to said intermediate shaft housing, said pivotal mounting means for said housing comprising a bracket mounted on said plate in the central portion thereof, said bracket having spaced apart bearings, a first shaft journalled in said bracket bearings, means defining a sleeve carried on said housing and receiving said first shaft for permitting swingable movement of said housing about said first shaft, said roller means comprising second bearings provided on said plate and being spaced apart transversely thereof, said second bearings being located downwardly of said first bearings, a rock arm journalled in said second bearings, spaced apart bearing members fixed on said rock arm between said second bearings, a second shaft journalled in said bearing members in axial parallel relation to said rock arm, a roller fixed on said second shaft and engageable upon its periphery with said housing downwardly of said sleeve, a lever arm integral with said rock arm at one end of the latter and extending beyond the adjacent portion of said plate whereby upon manipulation of said lever arm said rock arm may be swung to remove said roller from engagement with said housing to free the housing for swinging about the said first shaft.

* * * * *